Feb. 15, 1949.   W. F. SCHACHT   2,461,778
CASTER
Filed May 7, 1947
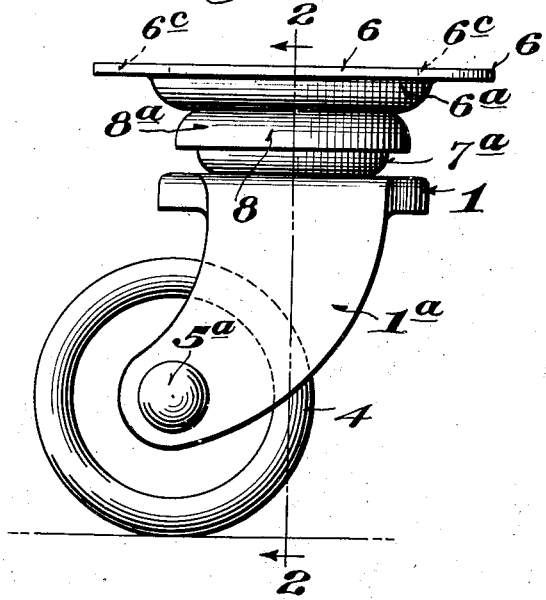
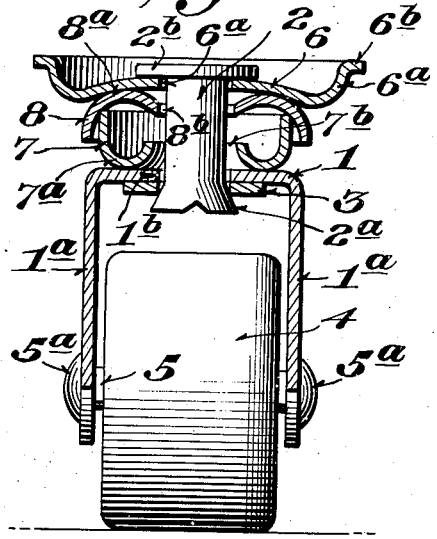
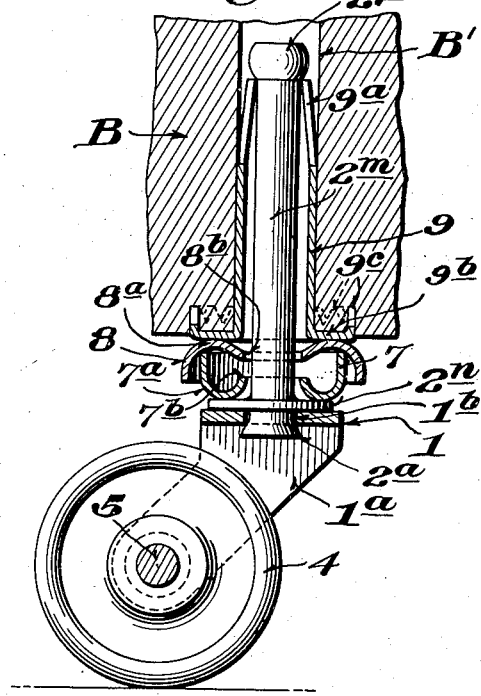

Patented Feb. 15, 1949

2,461,778

UNITED STATES PATENT OFFICE 2,461,778

CASTER

William F. Schacht, Huntington, Ind.; William J. Schacht, executor of said William F. Schacht, deceased, assignor to William F. Schacht, II, and Robert W. Schacht, both of Huntington, Ind.

Application May 7, 1947, Serial No. 746,482

8 Claims. (Cl. 16—20)

This invention is a novel improvement in casters for furniture or the like, and the principal object thereof is to provide a simple, novel, and efficient caster in which the use of ball bearings is eliminated, thereby obviating the possibility that the caster will not properly swivel as is the case in ball bearing casters when one of the balls becomes broken.

Other minor objects of the invention will be hereinafter set forth.

I will explain the invention with reference to the accompanying drawing, which illustrates several practical embodiments thereof to enable others familiar with the art to adopt and use the same; and will summarize in the claims the novel features of construction and novel combinations of parts for which protection is desired.

In said drawing:

Figure 1 is a side elevation of one embodiment of my novel caster adapted to be secured to the under side of an article of furniture or the like.

Fig. 2 is a vertical section on the line 2—2, Fig. 1.

Fig. 3 is a vertical section through a modified type of caster embodying my invention.

As shown in Figs. 1 and 2, my novel caster preferably comprises a swivel plate 1 having depending legs 1a at opposite sides thereof, said legs being offset from the vertical axis of the plate, as shown in Fig. 1. Plate 1 is provided with a central circular opening 1b for the reception of a stud 2, having its lower end outwardly flared as at 2a, a washer 3 or the like being provided between the outwardly flared end 2a of stud 2 and the under side of plate 1, as shown in Fig. 2. Between the legs 1a, at the outer ends thereof, is a roller 4 journaled on a bolt or rivet 5, having heads 5a overlying the outer faces of legs 1a.

Stud 2 carries on its upper end an enlarged head 2b, the underside of which engages a base plate 6, having a central opening 6a receiving the stud 2 as shown, head 2b of the stud preventing separation of the base plate 6 from the swivel plate 1 beyond a predetermined extent. Preferably the central portion of the base plate 6 is concave, as shown in Fig. 2, with its periphery curved upwardly as at 6a and outwardly as at 6b, the outwardly extending flanges 6b being provided with screw-receiving holes 6c whereby the base plate 6 may be secured by screws or the like to the underside of an article of furniture, such as a frame or a leg, with the head 2b of stud 2 disposed below the plane of the upper face of flange 6b.

Seating upon the top of the swivel plate 1 is a cup-shaped member 7 having side walls disposed substantially parallel with the axis of stud 2, and its lower end rounded inwardly as at 7a and seating upon the upper face of swivel plate 1, said member 7 having a central opening 7b in its bottom loosely receiving the stud 2, the rounded lower end 7a of the member 7 being readily rotatable upon the upper surface of swivel plate 1 without undue friction.

Above the member 1 is an inverted cup-shaped member 8 having its side walls at its lower end disposed substantially parallel with the axis of stud 2, the said walls embracing the upper side walls of member 7, as shown. The upper end of member 8 is rounded as at 8a to engage the underside of the base plate 6, as shown in Fig. 2, the upper surface having an opening 8b therein loosely receiving the stud 2 whereby the parts 7 and 8 may rotate freely with respect to the stud 2 and the plates 1 and 6, the length of stud 2 however being such as to maintain the upper periphery of the member 7 in contact with the rounded portion 8a of the member 8, as shown in Fig. 2.

By the above construction, the members 7 and 8 will be securely locked in position between plates 1 and 6 on stud 2 and may rotate relatively and with a minimum frictional engagement with the plates 1 and 6, thus permitting the swivel plate 1 to rotate without undue friction with respect to the base plate 6. The above construction eliminates the use of ball bearings which have been found in practice to break, and thus, by reason of a broken bearing, to prevent ready swiveling of the swivel plate 1 with respect to the base plate 6. Moreover, such construction is obviously less expensive than the ball bearing type caster, and the opposed cup-shaped members 7 and 8 may be readily stamped from sheet metal by simple process, the opposed cup-shaped members 7 and 8 taking the weight of the article of furniture. In practice it is found that the actual cost of construction of my novel caster is approximately half that of a ball bearing caster, and, for reasons stated above, is more sturdy and practical.

In Fig. 3 a different type caster is shown, the same however embodying the same cap shaped members 7 and 8 of the caster shown in Figs. 1 and 2. In Fig. 3 similar parts are similarly numbered. In this modification, the stud 2 is elongated as at 2m, and the lower end passes through the opening 1b in the swivel plate 1 and is outturned as at 2a as in the preceding figures. However, a flange 2n is formed on the stud 2 immediately above the base plate 1, so that the stud 2m will be securely anchored to the swivel plate 1.

Stud 2m has a head 1p at its upper end. Upon the flange 2n of stud 2m is seated the cup-shaped member 7, which is identical in all respect to that disclosed in the preceding figures; and above the cup-shaped member 7 is the inverted cup-shaped member 8, also similar in all respects to that shown in the preceding figures. However in this modification, the cup-shaped member 8 is adapted to engage the underside of a sleeve 9 loosely fitting the upper portion of the stud 2m and having an inturned split upper end 9a engaging the underside of the head 2p of the stud 2m, sleeve 9 having an outturned flange 9b at its lower end directly contacting the upper face of the member 8, flange 9b having an upturned toothed peripheral portion 9c, as shown in Fig. 3.

In practice, the sleeve 9 would be driven into a bore B' in the leg B of an article of furniture, so that the teeth 9c enter the leg adjacent the bore B', the sleeve thus becoming fixedly secured in the bore of the leg of the article of furniture. The shank of the caster shown in Fig. 3, however, would be retained in the sleeve when inserted in the bore B' by engagement of the split upper end 9a of the sleeve 9 which engages the underside of the head 2p of the stud 2m, as clearly shown. The cup-shaped members 7 and 8 of the caster shown in Fig. 3 would operate in the same manner as that disclosed in the preceding figures.

I do not limit my invention to the exact forms shown in the drawing, for obviously changes may be made therein within the scope of the claims.

I claim:

1. In a caster for furniture or the like; a swivel plate; a roller journaled on said plate; said plate having a circular opening on its vertical axis; a stud having its lower end extending through the said opening and having an enlarged head engaging the underside of the plate; said stud having a head on its upper end; a base plate on said stud adapted to be secured to an article of furniture and engaging the said head at the upper end of the stud; a cup-shaped member having a central opening receiving said stud and having its base seating upon the swivel plate; and an inverted cup-shaped member of larger diameter than the first mentioned cup-shaped member having a central opening receiving said stud and having its base engaging the underside of the base plate and having its side walls surrounding the side walls of the first mentioned cup-shaped member.

2. In a caster as set forth in claim 1, the bases of the cup-shaped members adjacent the central openings being curved away from the planes of the swivel plate and base plate.

3. In a caster as set forth in claim 1, said base plate having a concave central portion engaged by the base of the inverted cup-shaped member; the periphery of said central portion being turned upwardly and outwardly in a plane above the head at the upper end of the stud.

4. In a caster for furniture or the like; a swivel plate having depending legs offset from the vertical axis of the plate; a roller between the lower ends of the legs and journaled therein; said plate having circular opening on its vertical axis; a stud having its lower end extending through the said opening and having an enlarged head engaging the underside of the plate; said stud having a head on its upper end; a base plate on said stud adapted to be secured to an article of furniture and engaging the said head at the upper end of the stud, a cup-shaped member having a central opening receiving said stud and having its base seating upon the swivel plate; and an inverted cup-shaped member of larger diameter than the first mentioned cup-shaped member having a central opening receiving said stud and having its base engaging the underside of the base plate and having its side walls surrounding the side walls of the first mentioned cup-shaped member.

5. In a caster as set forth in claim 4, the bases of the cup-shaped members adjacent the central openings being curved away from the planes of the swivel plate and base plate.

6. In a caster as set forth in claim 4, said base plate having a concave central portion engaged by the base of the inverted cup-shaped member; the periphery of said central portion being turned upwardly and outwardly in a plane above the head at the upper end of the stud.

7. In a caster as set forth in claim 4, said stud having a collar seating upon the upper face of the swivel plate, and said first mentioned cup-shaped member seating on said roller.

8. In a caster as set forth in claim 7, said stud being elongated, and said base plate having a sleeve receiving the stud, said sleeve having an inturned split upper end engaging the underside of the head at the upper end of the stud.

WILLIAM F. SCHACHT.

REFERENCES CITED

The following references are of record in the file of this patent:

UNITED STATES PATENTS

| Number | Name | Date |
|---|---|---|
| 636,148 | Kenyon | Oct. 31, 1899 |